April 5, 1955  J. B. EISEN  2,705,370
APPARATUS FOR FORMING SCRATCHES ON HARD SURFACES
Filed Jan. 22, 1952
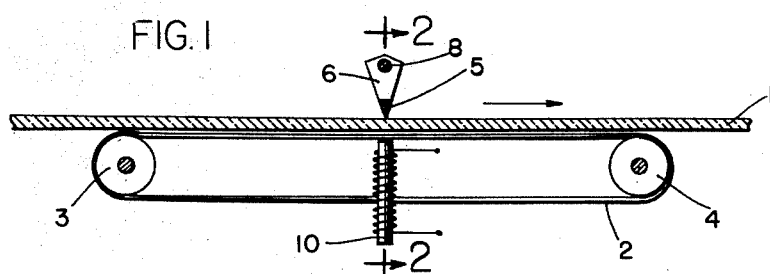
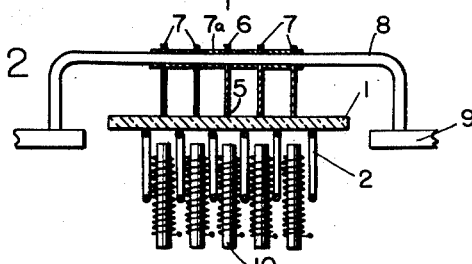
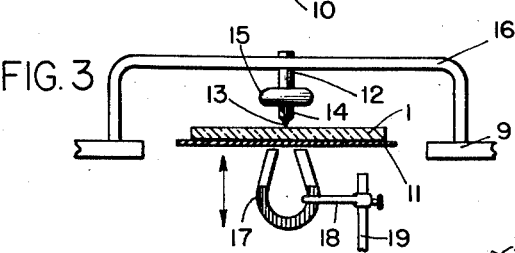
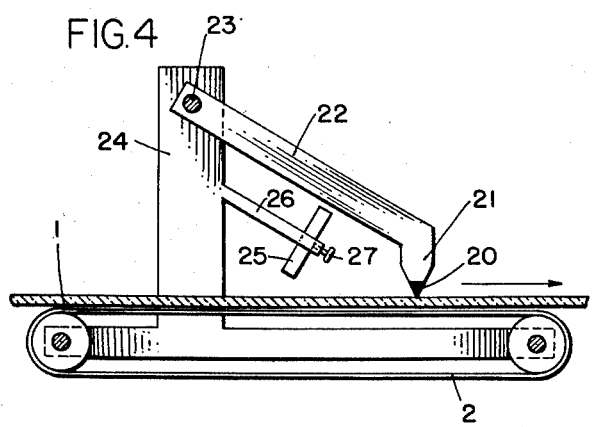
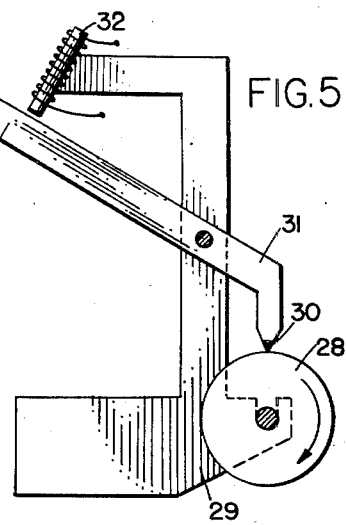
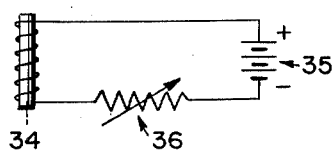
*INVENTOR:*
JOHN B. EISEN
BY
ATT'YS

United States Patent Office 2,705,370
Patented Apr. 5, 1955

2,705,370

APPARATUS FOR FORMING SCRATCHES ON HARD SURFACES

John B. Eisen, Waterloo, Wis., assignor to Bjorksten Research Laboratories, Inc., Chicago, Ill., a corporation of Illinois Application January 22, 1952, Serial No. 267,609

1 Claim. (Cl. 33—21)

This invention relates to an apparatus for forming uniform scratches or grooves on hard surfaces.

It is known to impart favorable electrical conducting properties to plastic or glass sheet materials, or sheets of other electrically non-conducting materials, by forming scratches or grooves of uniform dimensions and filling the scratches with an electrically conducting material, such as graphite, metallic powders and the like. Heretofore, the most convenient way of forming such scratches or grooves has been by rubbing or polishing the hard surface with an abrasive material. This process is expensive and time consuming and usually results in scratches or grooves of varying dimensions.

A principal object of this invention is to form scratches or grooves on hard surfaced materials in an inexpensive manner, which grooves or scratches will have uniform and dependably reproducible dimensions.

Another object of the invention is to provide an apparatus for forming uniform, reproducible scratches or grooves which is simple, inexpensive and easily adjustable.

A further object of the invention is to provide a method for forming uniform, reproducible scratches or grooves in a hard surfaced material in a rapid, inexpensive operation.

These and other objects and advantages of the invention will become more apparent upon a consideration of the following description, taken in conjunction with the drawings in which:

Figure 1 is an elevational view partially in section of one embodiment of the apparatus according to this invention;

Figure 2 is a sectional view taken along the lines 2—2 of Figure 1;

Figure 3 is a view similar to Figure 2 but showing another embodiment of the invention with an adjustable permanent magnet and a non-magnetic scratching point;

Figure 4 is a diagrammatic view of still another embodiment of the invention showing an adjustable permanent bar magnet;

Figure 5 is a diagrammatic view of still another embodiment of the invention showing an electromagnet placed above the workpiece and a curved smooth surface on the material to be scratched; and Figure 6 is an electrical diagram of one form of an electrical connection suitable for use with electromagnets in the practice of the invention.

In fulfillment of the foregoing objects and in accordance with the practice of the present invention there is now provided an apparatus for forming uniform scratches or grooves in a hard-surfaced material by mounting a scratching means for independent movement adjacent the surface of the material to be scratched, and drawing or urging the scratching means into the surface of the material as it is advanced past the tip of the scratching means. By a simple adjustment of the magnetic force applicable to the magnetically attractable scratching means it is possible to urge or force the cutting tip of the scratching means into the material to form scratches, cuts or grooves of uniform and reproducible dimensions.

It is readily apparent that scratches formed by the freely mounted scratching means will be almost imperceptible and insufficient for purposes of the invention unless some force is applied to urge the scratching point into the material. The scratching means could be urged into the material by manual force or by the application of weights, springs and the like. These means of applying force are impractical, however, because it is a very tedious task to make any adjustment and very difficult to apply a uniform force at all times. This is particularly true where it is desired to produce a plurality of parallel scratches each having uniform and equal dimensions. It is possible, however, by the practice of the present invention to apply magnetic force to one or a plurality of independent and freely mounted scratching means in such a manner that each will be urged into the material with an equal and readily adjustable force at all times. The equal magnetic force may be applied to several cutters or scratches at the same time by using one large magnet or a series of smaller magnets of similar magnetic force. If electromagnets are used, it is a simple matter to equalize the electrical current to each.

Referring to the drawings in detail a preferred embodiment of the invention is illustrated in Figures 1 and 2. A sheet member 1 having a hard surface is advanced along the conveyor 2 in the direction of the arrow. The conveyor 2 is supported on the pulleys 3 and 4 and may be of any suitable design, either solid or open. As the sheet 1 advances, it comes in contact with the point 5 of a magnetically attractable scratching member 6 which is freely and independently mounted, along with other scratching members 7—7 on a shaft 8 which is suitably supported on a frame member 9. The member 6 and the point 5 may be made of the same hard metal such as a tool steel if desired or the member 6 may be of less expensive material such as ordinary steel or iron with only the tip 5 being of hard, cutting metal. Spacer members 7a may be used to maintain the relative position of the cutters or scratchers 6 and 7.

Since the member 6 is freely mounted on the shaft 8 it will rest lightly on the surface of the sheet 1 and will not produce a perceptible scratch on the surface. The point 5 of the scratching member 6 is urged downwardly into the surface of the sheet 1 so as to form a perceptible scratch therein by the application of magnetic force from the electromagnet 10 which is positioned underneath the conveyor 2, with the sheet 1 passing between the magnet 10 and the member 6. The electromagnet 10 is of conventional design and will exert substantially no pull on the scratching member 6 unless an electrical current is caused to flow through the magnet. The intensity of the force or pull exerted on the scratching member 6 depends upon the intensity of the electric current passing through the magnet 10 and may very readily be controlled and adjusted by the use of rheostats, transformers or other variable resistances as shown more fully in Figure 6.

In the form of the invention illustrated in Figure 3 the sheet material 1 is carried by the conveyor 11 and is advanced beneath the scratching member 12 which is of slightly different design from the scratching member 6 in Figures 1 and 2. In Figures 1 and 2 the point 5 is illustrated as being of magnetically attractable material, such as a hard steel alloy. In Figure 3 it is contemplated that the scratches may be formed by a non-magnetic point 13 of such non-magnetic substances as, for example, sapphire, diamond, silicon carbide and the like. The point 13 is mounted in a conventional manner in a holder 14 which may or may not be made of a magnetically attractable metal. In order to provide additional means for magnetically urging the point 13 into the sheet 1 a collar 15 of a strongly magnetically attractable metal, such as soft iron, is positioned about the body of the scratching member 12 adjacent the point 13. The member 12 is pivotally mounted for free movement on a rod 16 which in turn is suitably attached to a frame member 9.

The magnetic force which is used for urging the point 13 of the scratching member 12 into the sheet material 1 is a permanent magnet 17 of any conventional shape, such as the horseshoe magnet illustrated in Figure 3. The intensity of the force by which the point 13 is urged downwardly into the sheet 1 is regulated by adjusting the position of the magnet 17 upwardly or downwardly by means of the clamp 18 on the stationary support 19. It will be understood of course that any other suitable design of permanent magnet may be employed in place of the horseshoe magnet 17 and that other conventional means such as a rack and pinion arrangement may be employed for raising and lowering the magnet to vary the magnetic force applied to the scratching member 12. If two or more scratching members are employed to produce uniform, parallel scratches or grooves, the magnet 17 may be selected large enough to attract all of the members equally. Likewise a plurality of magnets may be mounted for simultaneous movement to attract one or more scratching members.

It will be apparent that the invention may take innumerable forms and that the relative positions and forms of the sheet, the scratching member and the magnet may be changed in a large number of ways. While it would be impractical to attempt to illustrate all of the various combinations and arrangements which fall within the scope of this invention, it is desired to show two more embodiments of the invention for further illustrative purposes. In Figure 4 the sheet 1 is carried by the conveyor 2 in the direction of the arrow and passes underneath the hardened point 20 of a magnetically attractable scratching member 21 which takes the form of a lever. The arm 22 of the lever is pivoted at 23 on a suitable frame member 24 and in this arrangement it no longer is necessary that the magnetic force be transmitted through the conveyor and through the sheet material from the magnet to the scratching member as illustrated in Figures 1, 2 and 3. In Figure 4 a bar magnet 25 is illustrated as being clamped in a support 26 in which it is adjustable by operation of the wing nut 27. The bar magnet 25 may be advanced toward the magnetically attractable arm 22 of the scratching member 21 and may be positioned with respect thereto to urge the point 20 into the sheet 1 with any desired magnetic force within the capacity of the magnet 25.

In Figure 5 the material to be scratched is illustrated in the form of a disk or roll 28 which is suitably journalled in a supporting frame 29 for rotation therein. A hardened point 30 on a magnetically attractable scratching lever 31 is adapted to be urged into the surface of the roll 28 by means of the force exerted by the electromagnet 32 on the opposite magnetically attractable end 33 of the lever 31.

Referring briefly to Figure 6 in which one form of electrical connection is shown, the electromagnet 34 may take any known shape and the battery 35 may be substituted by a generator. The variable resistance 36 may also be substituted by a transformer or by other known means for varying the electric current flowing from the battery to the magnet.

In the operation of the embodiment of the invention illustrated in Figures 1 and 2 a sheet of glass or hard-surfaced plastic is advanced on the conveyor beneath the point of the scratching member or plurality of scratching members which are in a plane perpendicular to a plane of motion of the material to be scratched. By introducing a controlled amount of electric current to the magnets located beneath the sheet it is possible to draw the points downwardly into the sheet material so that they will cut or scratch a plurality of evenly spaced scratches or grooves, all having uniform and readily reproducible dimensions. It is obvious that by merely increasing or decreasing the amount of electrical current flowing to the magnets by known means that one may produce scratches of any suitable depth and dimension.

While the sheet material described above has been illustrated as being of glass or hard-surfaced plastic, it is contemplated that any suitable hard-surfaced material, including metals may be employed. The material to be scratched is usually in the form of a plane sheet but it may have a curved surface, as in a round bar or tube. Likewise, while the cutters or scratchers illustrated in the invention have been shown in particular forms, it should be understood that the design of the scratching members is not a limitation of this invention. If the members are made of magnetically attractable metals, such as hard steel alloys, they may take the form of needles, triangles, rectangles and the like so long as a single point is brought to bear on the surface of the sheet material. Where a non-conducting hard point is employed, such as diamond or silicon carbide, any type of bar of a magnetic metal may be employed as a holder for the point. As previously stated the form of the magnet is not a limitation of this invention since it is contemplated that electromagnets of any shape and form may be employed as well as permanent magnets of the bar, V or U-shape. When using an electromagnet the adjustment of the magnetic force will be made by varying the intensity of electric current flowing to the magnet. When a permanent magnet is employed, the force of the magnet will be varied by adjusting the distance between the magnet and the magnetically attractable metal.

It is apparent from the foregoing disclosure of the invention that it applies to many different modifications for the purposes intended and the disclosure is not to be limited to the specific illustrations shown herein by way of example. By the practice of the invention it is possible to impart one or a plurality of scratches to a hard surfaced material and to produce the scratches with uniform depth and dimension. Furthermore, the invention is applicable to continuous operation and may be practiced with a minimum of manual adjustments.

The invention is hereby claimed as follows:

In an apparatus for cutting scratches in a hard surfaced material, a pivotally mounted lever, a cutting tool attached to one end of said lever, means for advancing said material past said cutting tool, means for controlling the depth of said tool in said material consisting solely of magnetic means comprising a stationary fixed bar of magnetizable material, coil means for magnetizing said bar, means for varying the electrical current through said coil means, said magnetic means adapted to pivot said lever and thus to urge said cutting tool against said material without the interposition of any counteracting force except the resistance of said material itself, said magnetic means adapted to provide said urging by acting against a portion of said lever remote from said cutting tool.

References Cited in the file of this patent

UNITED STATES PATENTS

| 1,832,124 | Howard | Nov. 17, 1931 |
| 1,836,365 | Drake | Dec. 15, 1931 |
| 1,970,930 | Brasseur | Aug. 21, 1934 |
| 2,103,875 | Shock | Dec. 28, 1937 |
| 2,556,757 | Guild | June 12, 1951 |

FOREIGN PATENTS

| 655,228 | Great Britain | July 11, 1951 |